United States Patent [19]

Marosi et al.

[11] Patent Number: 4,849,395
[45] Date of Patent: Jul. 18, 1989

[54] PREPARATION OF AMORPHOUS METAL/MAGNESIUM SILICATES

[75] Inventors: Laszlo Marosi, Ludwigshafen; Joachim Stabenow, Weinheim; Knut Eger, Limburgerhof; Matthias Irgang, Heidelberg; Guenter Zirker, Ludwigshafen, all of Fed. Rep. of Germany

[73] Assignee: BASF Aktiengesellschaft, Ludwigshafen, Fed. Rep. of Germany

[21] Appl. No.: 167,251

[22] Filed: Mar. 11, 1988

[30] Foreign Application Priority Data

Mar. 28, 1987 [DE] Fed. Rep. of Germany ....... 3710433

[51] Int. Cl.$^4$ ............................................ B01J 21/14
[52] U.S. Cl. .................... 502/251; 502/234; 502/244; 502/252
[58] Field of Search ............... 502/244, 251, 234, 252

[56] References Cited

U.S. PATENT DOCUMENTS

| 1,738,971 | 12/1929 | Storch | 502/244 |
| 2,406,929 | 9/1946 | Teter | 502/251 |
| 3,409,562 | 11/1968 | Bridge | 502/251 |
| 4,178,310 | 12/1979 | Fetchin et al. | 502/244 |

FOREIGN PATENT DOCUMENTS 0151153 10/1981 Fed. Rep. of Germany ...... 502/244

Primary Examiner—Carl F. Dees
Attorney, Agent, or Firm—Keil & Weinkauf

[57] ABSTRACT

Amorphous metal/magnesium silicates of the general formula $$M_xMg_y(SiO_2) \cdot nH_2O.$$

where M is a divalent, reducible metal atom from the group consisting of Cu, FeII, Co and Ni, x and y are numbers which together can add up to a value of 1.5 and n after drying, expressed in % by weight, ranges from 0 to 80 are prepared by subjecting a freshly precipitated magnesium silicate to an ion exchange, washing the product and then neutralizing it with an alkali and are used in catalytic reactions after the reducible metal in the metal/magnesium silicates has been converted into the metallic state with a reducing gas.

3 Claims, No Drawings

PREPARATION OF AMORPHOUS METAL/MAGNESIUM SILICATES

It is known to use catalysts on MgSiO3 carriers for gas purification, methanization, and various hydrogenation reactions. The catalysts, although empirically they have the same chemical composition, can be structurally different and hence have different catalytic activities. In many cases, the MgSiO3 functions as a pure carrier material onto which the active components, for example salts of Ni, Cu, FeII or Co with alkali or alkali metal carbonates, are precipitated. However, preference is generally given to alkali metal carbonates for precipitating the metal components.

It was observed that, depending on the method of preparation, the MgSiO3 not only acts as a pure support material but can also combine with the added metal ions in the presence of, for example, sodium carbonate and at around pH 7 to form metal/magnesium silicates of varying composition which, mixed with Cu salts, are present as malachite and also act as catalysts. This method of catalyst production has the disadvantage that it is difficult or impossible to produce and that the precipitation products frequently contain major amounts of CO2 which interferes with gas purification processes. The result is that the activity is not always what it should be.

It is an object of the present invention to eliminate these disadvantages and to produce catalysts which have a high activity and, what is more, can be produced reproducibly.

We have found that this object is achieved, and the disadvantages described are avoided, in that active amorphous metal/magnesium silicates of the general formula $$M_xMg_y(SiO_2) \cdot nH_2O,$$

where M is a divalent, reducible metal atom from the group consisting of Cu, FeII, Co and Ni, x and y are numbers which together can add up to 1.5, and n after drying, expressed in % by weight, ranges from 0 to 80, are obtainable in a reproducible manner by subjecting a freshly precipitated magnesium silicate to an ion exchange, washing the product and then neutralizing it with alkali.

Before application of the metal/magnesium silicates in catalytic reactions the reducible metal in the metal/magnesium silicates is converted with reducible gases into the metallic state.

The idea underlying the invention is that active catalysts based on MgSiO3 are obtained when the metal ions are not, as is generally customary, incorporated in the amorphous structure of MgSiO3 by coprecipitation but by specific ion exchange. It is true that ion exchange can take place to a substantial extent in the course of coprecipitation, but the catalysts obtained are composed of a plurality of components and, depending on the method of production, are impossible to produce reproducibly or uniformly.

The Mg silicates produced according to the invention are amorphous products of uniform composition and high catalytic activity. Advantageously, the Mg silicate precipitate prepared first is filtered off and admixed with the corresponding metal salts. In the course of admixture, an ion exchange takes place to give amorphous compounds of the general formula $$M_xMg_y(SiO_2) \cdot nH_2O,$$

which, upon reduction, produce particularly finely divided metals or, upon decomposition, give particularly finely divided metal oxides.

Metal atoms which are easily incorporable in the magnesium silicate lattice are for example Cu, FeII, Co and Ni. However, the ion exchanger component can also comprise other divalent metal salts.

Advantageously, after ion exchange the product is neutralized, for example with alkali or sodium carbonate, washed, dried and calcined. Despite the neutralization with sodium carbonate, the CO2 content of the precipitation products is astonishingly low, so that no disadvantages arise in gas purification processes. The magneium silicate required for ion exchange can be prepared for example by coprecipitation of waterglass with, for example, Mg(NO3)2 solutions. It is advantageous if, in the coprecipitation, the MgO:SiO2 ratio is set to $\leq 1$.

The catalyst produced according to the invention can be used after reduction with suitable gases for various purposes, for example in gas purification, methanization, hydrogenation or for cracking reactions.

EXAMPLE

Preparation of amorphous Cu-Mg silicates

A solution 1 comprising
100 g of water glass (26.9% of SiO2, 8.7% of Na2O),
21.03 g of NaOH and
89.3 g of water and
a solution 2 comprising
98 g Mg(NO3)2×6 H2O and
50.3 g of water
are added simultaneously at 30° C. to 500 ml of previously introduced H2O in the course of about 20 minutes. After the precipitation has ended, the resulting suspension is stirred for about 10 minutes. The pH is 9–10.

0.3 mol of Cu(NO3)2×3 H2O (72.48 g) is then dissolved in 120 ml of H2O, and the solution is added with stirring to the Mg silicate suspension. Stirring is continued until the filtrate is colorless.

The blue precipitate is then filtered off, washed with 1.2 l of H2O and introduced into 500 ml of 7.5% strength sodium carbonate solution. After 15 minutes of stirring, the precipitate is filtered off, washed and dried.

The product is an amorphous Cu-Mg silicate containing 35% of CuO, 9% of MgO and 38% of SiO2. The CO2 content is not more than 1.5%. The product is thermally resistant up to not less than 400° C. and on calcination does not produce CuO.

Reduction of metal/magnesium silicates:

This product is subsequently calcined at 300° C. and pelletized into tablets 3×5 mm. The strength is 300 kg/cm². To use the tablets as catalysts, they are treated at 220° C. in the intended reactor with a gas mixture comprising for example 2% of H2 and 98% of N2 under atmospheric pressure until H2O vapor is no longer detectable in the offgas. The catalyst can be used directly for removing oxygen traces from gases down to a few ppm.

We claim:

1. A process for preparing an amorphous metal/magnesium silicate of the formula $$M_xMg_y(SiO_2) \cdot nH_2O,$$

where M is a divalent, reducible metal atom from the group consisting of Cu, FeII, Co and Ni, x and y are numbers which together can add up to a value of not more than about 1.5, and n after drying, expressed in % by weight, ranges from 0 to 80, which comprises subjecting a freshly precipitated magnesium silicate to an ion exchange, washing the product and then neutralizing it with an alkali.

2. The process of claim 1, wherein the reducible metal of the metal/magnesium silicate is converted to its reduced state by treatment with a reducing gas.

3. The catalyst produced by the process of claim 2.

* * * * *